United States Patent
Okano

(10) Patent No.: US 9,855,524 B2
(45) Date of Patent: Jan. 2, 2018

(54) GAS RECOVERY CONCENTRATION APPARATUS

(71) Applicant: SEIBU GIKEN CO., LTD., Fukuoka (JP)

(72) Inventor: Hiroshi Okano, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 8 days.

(21) Appl. No.: 15/074,326

(22) Filed: Mar. 18, 2016

(65) Prior Publication Data

US 2016/0271556 A1  Sep. 22, 2016

(30) Foreign Application Priority Data

Mar. 20, 2015 (JP) .................................. 2015-057045

(51) Int. Cl.
*B01D 53/06* (2006.01)
*B01D 53/62* (2006.01)
(Continued)

(52) U.S. Cl.
CPC ......... *B01D 53/06* (2013.01); *B01D 53/0438* (2013.01); *B01D 53/62* (2013.01);
(Continued)

(58) Field of Classification Search
CPC ........ B01D 53/06; B01D 53/62; B01D 53/83; B01D 2253/3426; B01D 2257/504; Y02C 10/08
(Continued)

(56) References Cited

U.S. PATENT DOCUMENTS 2,993,563 A    7/1961  Munters et al.
5,659,974 A *  8/1997  Graeff .................... B01D 53/06
                                              34/378
(Continued)

FOREIGN PATENT DOCUMENTS

JP    41-9235    5/1966
JP    4-83509    3/1992
(Continued)

OTHER PUBLICATIONS

Matsukuma et al., "Technology of Separation and Recovery of CO2 by Adsorption", *Technology of Separation and Recovery of CO2 and Storage and Isolation*, N.T.S. Co, Ltd., 2009, pp. 77-101 and 2 cover pages.
(Continued)

*Primary Examiner* — Frank Lawrence, Jr.
(74) *Attorney, Agent, or Firm* — Staas & Halsey LLP

(57) ABSTRACT

In the honeycomb rotor recovery concentration apparatus which collects gas, such as carbon dioxide, from stack gas etc., it collects by the highest possible recovery rate, and condenses to the highest possible concentration, and lessens the amount of energy for recovery concentration as much as possible. Adsorption zone 4, preheating zone 12, low concentration gas purge zone 15, desorption zone 5, high concentration gas purge zone 16, pre-cooling zone 13, and cooling zone 7 are provided to the hand of cut of a rotor. Low concentration gas is prevented from mixing in desorption zone 5, and high concentration gas is prevented from being spilt out from desorption zone 5. Pre-heating zone 12 and pre-cooling zone 13 constitute a circulation circuit, and it raises energy-saving nature by pre-cooling and carrying out preheating heat exchange by gas which circulates through a circuit.

12 Claims, 6 Drawing Sheets

(51) Int. Cl.
*B01D 53/83* (2006.01)
*B01D 53/04* (2006.01)

(52) U.S. Cl.
CPC ........ B01D 53/83 (2013.01); *B01D 2253/108* (2013.01); *B01D 2253/3425* (2013.01); *B01D 2257/504* (2013.01); *Y02C 10/04* (2013.01); *Y02C 10/08* (2013.01)

(58) Field of Classification Search
USPC ............. 95/113, 115, 139; 96/125, 126, 146
See application file for complete search history.

(56) References Cited

U.S. PATENT DOCUMENTS

| | | | | |
|---|---|---|---|---|
| 5,915,816 | A * | 6/1999 | Graff | B01D 53/261 34/378 |
| 9,303,884 | B2 * | 4/2016 | Pahwa | B01D 53/06 |
| 2009/0139254 | A1 * | 6/2009 | Landry | B01D 5/0033 62/271 |
| 2012/0000365 | A1 * | 1/2012 | Okano | B01D 53/06 96/144 |
| 2015/0153051 | A1 * | 6/2015 | Pahwa | F24F 3/1423 95/10 |

FOREIGN PATENT DOCUMENTS

| | | |
|---|---|---|
| JP | 6-91128 | 11/1994 |
| JP | 2001-205045 | 7/2001 |
| JP | 2001-255083 | 9/2001 |
| JP | 2003-181242 | 7/2003 |
| JP | 2004-344703 | 12/2004 |
| JP | 4542136 | 9/2010 |

OTHER PUBLICATIONS

Kagaku et al., "Technology of Separation and Recovery of CO2 by Chemical Absorption", *Technology of Separation and Recovery of CO2 and Storage and Isolation*, N.T.S. Co, Ltd., 2009, pp. 105-124 and 2 cover pages.

* cited by examiner

GAS RECOVERY CONCENTRATION APPARATUS

CROSS-REFERENCE TO RELATED APPLICATIONS

This application claims the benefit of Japanese Patent Application No. 2015-057045, filed Mar. 20, 2015, in the Japanese Patent Office, the disclosure of which is incorporated herein by reference.

BACKGROUND

1. Field

The present invention relates to a thermal swing carbon dioxide recovery concentration apparatus which collects carbon dioxide by a high recovery rate and condenses the carbon dioxide to high concentration with little consumption energy.

2. Description of the Related Art

The effort and trail to reduce carbon dioxide emitted from industry, a car and a home as much as possible as counterplan against global warming is carried out on the world level. For example, the apparatus which consumes energy is improved to become an energy saving type and the old apparatus is replaced by the improved apparatus. As apparatus which produces energies such as power generation, etc., some technologies using renewable energy such as sunlight and wind force, a thermal power plant is improved to raise the power generation efficiency and a technology of recovery concentration of the carbon dioxide emitted from a thermal power plant to store in underground or deep sea in the future is developed and researched.

In the above efforts and trials, especially the present invention relates to the technology for collecting and condensing carbon dioxide from the gas discharged from a thermal power plant, a combustion furnace, etc.

As the thermal power plant, some types of the plants use oil, natural gas and coal for fuel has spread most, and in addition to this, other types burn the garbage discharged from a city. The thermal power plant which uses coal as fuel has the following feature. That is, the electric power is supplied in a stabilized state since the coal is not expensive, there are many global deposits of coal farther than oil and a burying place is also in every corner of the earth so that the coal is easy to obtain.

However, the coal has a problem that the coal emits a carbon dioxide and a sulfide much at the time of combustion of the coal as compared with oil or natural gas. Not only coal but also heavy oil has the same problem as the coal has. For this reason, in the plant which uses coal and heavy crude oil as fuel, the device from which SOx and nitrogen oxide are removed is provided to prevent from environmental pollution.

However, even if SOx and nitrogen oxide were removed and it prevented environmental pollution, carbon dioxide was still emitted so much and there remains a problem of promoting global warming.

As an improvement plan, research and development in the technology of carrying out separation recovery concentration of the carbon dioxide in exhaust gas and storing the collected carbon dioxide in underground or deep sea is making progress. The separation recovery concentrating method of this carbon dioxide is proposed variously, for example, deep freeze method, absorbing method, adsorption method, film separation method, etc.

The deep freeze method is the method of pressurizing material gas and carrying out liquefaction separation of the carbon dioxide utilizing the difference of the liquefaction temperature of each gas under pressurization. In this method, the electric power of the compressor which compresses gas and the electric power of the freezer which carries out deep freeze are required. For example, if carbon dioxide levels are just over or below 10%, the remaining gas which does not need to be collected other than carbon dioxide and which is 90% also comes to be compressed and frozen simultaneously. Therefore, energy expenditure becomes excessive.

The absorbing method is the method of recovering by absorbing carbon dioxide by alkaline fluid such as an amine system, desorbing the carbon dioxide by heating and condensing the carbon dioxide. The method is already put to practical use. However, an expensive corrosion-resistant material is required for dealing with alkaline fluid, and it costs high. Although the heat exchanger was used for the key devices and energy saving of a whole system has been attained, since the calorific capacity of the fluid to be used is large, the limit of the energy saving is approached. (Non-patent literature 2) Furthermore, there is a problem of the secondary contamination since the medicine to be vaporized is used.

The adsorption method uses gas adsorption material such as zeolite and activated carbon, and has a pressure swinging method (the henceforth, PSA method) absorbs and desorbs using pressure difference and a thermal swinging method (the henceforth, TSA method) absorbs and desorbs using a difference in temperature. Since the PSA method is the method of separating and adsorbing only carbon dioxide by pressurizing and desorbing and recovering by decompressing the carbon dioxide utilizing the principle that the amount of adsorption of carbon dioxide depends on pressure, a pressure vessel is required for it. Precision instruments such as an electromagnetic valve, a compressor, a vacuum pump, etc., are also needed as peripheral equipment, and there is a problem that its enlargement is difficult.

The TSA method is the method of absorbing carbon dioxide at the temperature below Centigrade 50° C. (let all temperature be "Centigrade" henceforth) and desorbing the carbon dioxide by heating in temperature of around 100-200° C. for collecting the carbon dioxide. In the multiple bed type which changes by turns a plurality of adsorption towers filled up with carbon dioxide adsorption material to adsorption and reproduction, there is a fault that a fluctuation of the pressure and concentration of the gas by the change of the towers is not avoided since the pressure loss of gas is high. Also, there is a problem that the enlargement is difficult Also, in the TSA method, the possible method of formation of a low-pressure power loss or the enlargement by using a rotated type adsorption honeycomb rotor is disclosed in the patent documents 1-5. However, it is insufficient in respect of the energy-saving nature of the recovery rate of carbon dioxide, the concentration of carbon dioxide and the recovery energy.

Patent Documents

[Patent documents 1] Japanese Patent Laid Open H4-83509 A

[Patent documents 2] Japanese Patent Laid Open H6-91128 A

[Patent documents 3] Japanese Patent Laid Open 2001-205045 A

[Patent documents 4] Japanese Patent Laid Open 2003-181242 A
[Patent documents 5] Japanese Patent Laid Open 2004-344703 A
[Patent documents 6] Japanese Patent Laid Open S 41(1966)-9235
[Patent documents 7] Japanese Patent Laid Open 2001-255083 A
[Patent documents 8] Japanese Patent Registered No. 4542136 B Non-Patent Literature

[Non-patent literature 1] "Technology of Separation and Recovery of CO2 by adsorption", Technology of separation and Recovery of CO2 and Storage and Isolation P77-P101, NTS Co, LTD, 2009
[Non-patent literature 2] "Technology of separation and recovery of CO2 by chemical absorption", Technology of Separation and recovery of CO2 and Storage and isolation P105-P124, NTS Co, LTD, 2009

SUMMARY

Additional aspects and/or advantages will be set forth in part in the description which follows and, in part, will be apparent from the description, or may be learned by practice of the invention.

The inventor proposes a carbon dioxide recovery concentration apparatus using the rotated type adsorption honeycomb rotor, and proposes a recovery concentration apparatus with the high energy-saving nature of recovery rate, recovery concentration and recovery energy.

In the patent documents 1 and 2, the method of desorbing and recovering by using the rotor of the cylindrical shape-like container which contains granular carbon dioxide adsorption material divided into bucket-like containers is disclosed. In the method, the carbon dioxide is adsorbed at a adsorption zone by rotating the rotor or rotating a duct device and the high-concentration carbon dioxide is desorbed and recovered by heating gas at a desorption zone. With this technology, the pressure loss of gas is high and energy-saving nature is not taken into consideration, either. In the patent document 2, a method of using the heat of material gas for a heat source of desorption gas of carbon dioxide is disclosed. However, it is not taken into consideration about the energy-saving nature of the recovery concentration apparatus itself.

In the patent document 3, a rotor of honeycomb structure is proposed, and reduction of pressure loss is made. The rotor has an adsorption zone, a desorption zone by heating gas, a gas purge zone and a reproduction cooling zone (hereinafter "a cooling zone"). Also, in the document, a flow chart shows that the zones move in turns along with a rotation of the rotor. That is, by the rotation of the rotor, the absorption zone moves to the desorption zone, the desorption zone moves to the gas purge zone, the gas purge zone moves to the cooling zone, and finally goes back to the absorption zone. In a stage of moving to the next zone after passing through the desorption zone, the high concentration carbon dioxide gas included in a clearance of the honeycomb is moved to the next zone along with rotation of the rotor, and the gas is emitted into coolant gas in the next zone if the next zone is the cooling zone. It reduces a carbon dioxide recovery rate. The purge zone is provided as countermeasure. Since the honeycomb stores heat and it is high temperature after passing through the desorption zone and the purge zone, its adsorption power of carbon dioxide is weak. Therefore, the carbon dioxide flows out without adsorbing by the rotor if material gas is passed here. Then, the cooling zone is provided in front of the adsorption zone, and the rotor is constituted so that the cooling zone moves to the adsorption zone after cooling the honeycomb. Thereby, the recovery rate of carbon dioxide can be improved. In the desorption zone, a circulation circuit of a desorption gas heating coil and a desorption zone is constituted, the heat of the high temperature gas discharged from a boiler etc. is recovered to use for improving energy-saving nature. In the cooling zone, a circulation circuit of a gas cooling coil and a cooling zone is constituted, and it improves cooling efficiency.

In the patent document 4, an optimization of a whole system by using a boiler, a desulfurization facility, an eliminator, a honeycomb rotor dehumidifier system and a honeycomb rotor carbon dioxide recovery concentration apparatus as a system is proposed. However, the carbon dioxide recovery concentration apparatus lacks in un obviousness over the rotor in the patent document 3.

In the patent document 5, as adsorption material of a carbon dioxide adsorption rotor, X type zeolite of a range of 2-2.5 of the SiO2/Al2O3 ratio, which uses Li, Mg, Na, Ca, and Sr as a cation uses, is disclosed. However, the carbon dioxide recovery concentration apparatus lacks in un obviousness over the rotor in the patent document 3.

In the patent document 3, the purge zone is provided between the desorption zone and the cooling zone, and by rotation of the rotor, the high concentration carbon dioxide filled in a clearance of the honeycomb in the desorption zone moves to the cooling zone. Thus, the carbon dioxide prevents from being emitted to the cooling zone, and it improves the recovery rate. However, the honey comb which is filled with low-concentration material gas lower than the high-concentration gas moves to the desorbing zone by rotating of the rotor and is emitted in the desorption zone. Thus, there is a problems that the carbon dioxide levels in the desorption zone are thinned and as a result, the recovery concentration of the carbon dioxide falls.

As another problem, a rotor portion which comes out of the desorption zone moves to the cooling zone through the purge zone and moves to the desorption zone after cooling by the circulation gas between a gas cooling device and the cooling zone. However, there is a fault that a lot of amounts of coolant circulation gas for cooling are required, and a lot of the amount of cold water supplied to a gas cooler and the power of a blower are mostly needed.

The example of survey of Drawing 6 shows that a carbon dioxide recovery rate and a recovery concentration have a relationship of trade-off between them. If a recovery rate is raised up to 70% or more, recovery concentration is fixed at about 70%. Conversely, if the recovery rate is improved up to 90% or more, the recovery concentration is fixed at about 20%.

As stated above, a carbon dioxide recovery concentration apparatus has three subjects that the concentration and the recovery rate should be raised simultaneously and the consumption energy should be lowered dramatically.

In the patent document 6, a rotor type dehumidifier system in which a desorption zone, a pre-cooling zone, an adsorption zone and a preheating zone are provided along with a rotating direction of a rotor is disclosed. The system carries out pre-cooling and preheating by recirculating air in a closed circuit connecting the pre-cooling zone and the preheating zone. The energy-saving nature improves by this method. However, since the amount of circulating gas circulates the amount of flow aiming at pre-cooling and preheating. Thus, it cannot be prevented from the low concentration gas contained in the clearance of a rotor flowing into the desorption zone by rotation of a rotor and reducing desorption zone gas concentration. Also, it cannot be prevented from high concentration gas flowing into a reproduction cooling zone and reducing a recovery rate. That is, it is effective for a dehumidification use, however, it cannot use for the high concentration use of gas.

In the patent document 7, a rotated type heat exchanger which is provided with an open air-air supply zone, a purge zone A, a circulation-exhaust air zone and a purge zone B along with a rotating direction of the rotor is disclosed. Also, the closed circuit which circulates through purge zones A and B is constituted, and each of the air in the open air-air supply zone and the circulation-exhaust air zone makes the amount of flow into and out each other mutually minimum by mutual substitution of purging air. However, the above method can make an outflow of gas and an inflow reduced, there is no energy saving effect by this method.

Although there are an organic-solvent concentration apparatus and a dehumidifier in the recovery concentration apparatus adapting a honeycomb rotor type from the former, a view in which a carbon dioxide recovery concentration apparatus completely differs from the apparatus of these former is needed. If it is an organic-solvent concentration apparatus, hundreds of ppm may be condensed to thousands of ppm. Even if it is a dehumidifier, the vapor concentration of the reproduction exhaust air which the vapor concentration of processing air is several percent, and is a concentration side is also several percent order. On the other hand, in concentration of carbon dioxide, 10% of concentration order of processing gas must be made into 75 to 95% or more of the concentration after concentration.

In the patent document 8, a method and a system for lowering a concentration of sorption thing is disclosed. The system is provided with the first from the 6th zones along with a rotating direction of a rotor, the first zone corresponds with a desorption zone and the 4th zone corresponds with a desorption zone. The system has a first a second circulation circuits, the first circulation circuit is provided between the adsorption zone and the desorption zone in isolation to the above zones and recirculates the second and the 6th zones which are opposed each other by a closed loop and the second circulation circuit recirculates the third and the 5th zones which are opposed each other by a closed loop.

It is similar to the third preferred embodiment of the present patent application to have two sets of circulation circuits which circulate through two zones and is opposed each other, however, it is different from that the present application has seven zones.

That is, in the patent document 8, the apparatus is constructed to integrate the adsorption zone and the cooling zone of the present application.

If the concentration of material gas is in or under the vapor concentration grade in the atmosphere, when the concentration of the gas is made to lower, it is useful to provide the zone which integrates the adsorption and cooling functions as disclosed in the patent document 8. If it is an organic-solvent concentration apparatus, the concentration is thousands of ppm, and even if it is a dehumidifier in a condition of extreme high humidity and high concentration, the vapor concentration of reproduction desorption exit air is several percent order. However, in order to condense carbon dioxide gas to the high concentration around 90%, a special idea is required for the present application, and there is the necessity of constituting so that passage contact of the most high-concentration gas may be carried out in the final stage of adsorption. The reason is for adsorption capacity increases in a case where the concentration is so high and in a case where temperature is so low, as the carbon dioxide adsorption isotherm of the zeolite system adsorption material of Drawing 5 of the present application shows. In the proposed carbon dioxide concentration apparatus, there is the importance in dividing with the independent adsorption zone and the cooling zone.

In order to adsorb the carbon dioxide of the concentration around 10% and to condense to 90% or more of high-concentration carbon dioxide, the big subject how a honeycomb is cooled occurs. Although it is common sense that performance improvement can be carried out by cooling a honeycomb also with the above-stated organic-solvent concentration apparatus and a dehumidifier, there is the necessity of considering a different thing in the level.

The first reason is for a problem of adsorption capacity. In order to have to adsorb high-concentration gas far from the organic solvent or vapor, the amount of adsorption material injections to the adsorption zone to processing gas volume will be from several times to about ten times in comparison with an organic-solvent concentration apparatus and the dehumidifier. In other words, the rotor of volume from several times to ten times is needed in comparison with the previous apparatus according to the amount of material gas. Therefore, a cooling effect by the material gas is not sufficient to remove thermal storage of the honeycomb in which desorption is finished. Therefore, a large cooling zone which is wider of many times than an adsorption zone is needed and cooling gas many times of absorption gas must be circulated.

The second reason is for the heat of adsorption of carbon dioxide. If carbon dioxide is adsorbed from the gas which passes a honeycomb, heat of adsorption will occur, and the adsorption power of adsorption material declines because the temperature of the gas and the honeycomb increases with heat of adsorption. The heat of adsorption of carbon dioxide is about $1/6$ to $1/7$ of the heat of adsorption of vapor. However, in order to have to adsorb high-concentration carbon dioxide far as compared with an organic-solvent concentration apparatus or a dehumidifier, much heat of adsorption occurs. Therefore, unless it fully cools in a cooling zone, carbon dioxide adsorption in an adsorption zone becomes insufficient, and a recovery rate and the concentration of carbon dioxide do not go up. In view of the two reasons above, the cooling zone is provided in order to remove heat, however, the energy and the device for cooling become excessive.

In analyzing a test result and a simulation result, the carbon dioxide recovery energy of carbon dioxide recovery concentration apparatus of honeycomb rotor type is about 10 times than a sublimation latent heat of 573 kJ/kg considered to be a standard of carbon dioxide desorption energy. About 80 to 90 percent of the thermal energy supplied to a desorption zone is considered to be supplied only to warm a honeycomb (a binder which is fixing a honeycomb substrate, adsorption material, and adsorption material). In a cooling zone, there is a problem that energy expenditure increases in order to remove the huge thermal storage at this time as a "hanger-on."

As a big original problem about a high concentration apparatus, the gas contained in a honeycomb clearance moves into the next zone to flow out by rotation of a rotor.

In a portion of desorption zone immediately after movement into a desorption zone, low concentration gas mixes in high concentration gas, and high concentration gas is spilt out in the next zone in the portion moved to the next zone from the desorption zone. Therefore, recovery concentration is reduced, and a recovery rate does not increase.

The inventor proposes a honeycomb rotor revolving type carbon dioxide recovery concentration apparatus. It is constituted to return to an adsorption zone again through the adsorption zone, a preheating zone, a low concentration gas purge zone, a desorption zone by heating gas circulation, a high concentration gas purge zone, a pre-cooling zone and a cooling zone in turns along with a rotating direction of a rotor.

A preheating zone and a pre-cooling zone constitute a circulation circuit and circulate gas by a blower.

In a low concentration gas purge zone, high concentration gas purges and replaces low concentration gas contained in a honeycomb clearance just before moving to a desorption zone. In a high concentration gas purge zone, purge substitution of the high concentration gas contained in a honeycomb clearance just before moving to the next zone from a desorption zone is carried out by low concentration gas.

In a pre-cooling zone, a honeycomb is pre-cooled by the gas to pass, heat is absorbed, temperature rises and gas circulates to a preheating zone. In order to recover adsorption capability, the pre-cooled honey comb moves to a cooling zone and it is further cooled. Thus, the pre-cooled honeycomb has the advantage that the cooling energies in a cooling zone are reducible.

In a preheating zone, the gas whose temperature increases by passing through a pre-cooling zone is introduced, a honeycomb is preheated by the gas, the gas is cooled, and the gas circulates to a pre-cooling zone. After the preheated honeycomb moves to a desorption zone, it is heated by high temperature and high concentration carbon dioxide gas and carbon dioxide is desorbed, and the amount of thermal energies in a desorption zone is reducible by preheating.

A pre-cooling zone and a preheating zone are provided as stated above, the circuit which circulates through each is constituted, and it has the advantage that the amount of cooling energies and the heating amount of energy for desorption are simultaneously reducible by circulating gas.

In view of a field of carbon dioxide recovery concentration efficiency, since the desorption zone contains high-concentration carbon dioxide gas which has a high temperature, the carbon dioxide which is stuck to an adsorption material remains without being completely desorbed. Since low-concentration carbon dioxide gas as compared with the desorption zone passes when the rotor moves to a pre-cooling zone and the honeycomb still has heat storage at high temperatures, there is an advantage that desorption of the carbon dioxide which remained is promoted.

The gas passed through the pre-cooling zone is added by the carbon dioxide desorbed during passage, becomes higher than the carbon dioxide levels of material gas, and is introduced into a preheating zone. The honeycomb which moved to the pre-heating zone from the adsorption zone has already adsorbed carbon dioxide in the adsorption zone. Since the gas introduced into the pre-heating zone is high concentration and the honeycomb is low temperature, there is an advantage that the honeycomb adsorbs carbon dioxide further in the preheating zone. Thus, a synergistic effect that the effect of desorption increase and the adsorption effect also increase can obtain the same effect as that the adsorption capacity of the adsorption material itself increase.

In a low concentration gas purge zone, the fall of recovery concentration is prevented by carrying out purge substitution of the low concentration gas contained in a honeycomb clearance just before moving to a desorption zone by high concentration gas.

In a high concentration gas purge zone, high concentration gas can be prevented from being spilt out by carrying out purge substitution of the high concentration gas contained in a honey comb clearance just before moving to the next zone from a desorption zone by low concentration gas.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION

Figure 1:
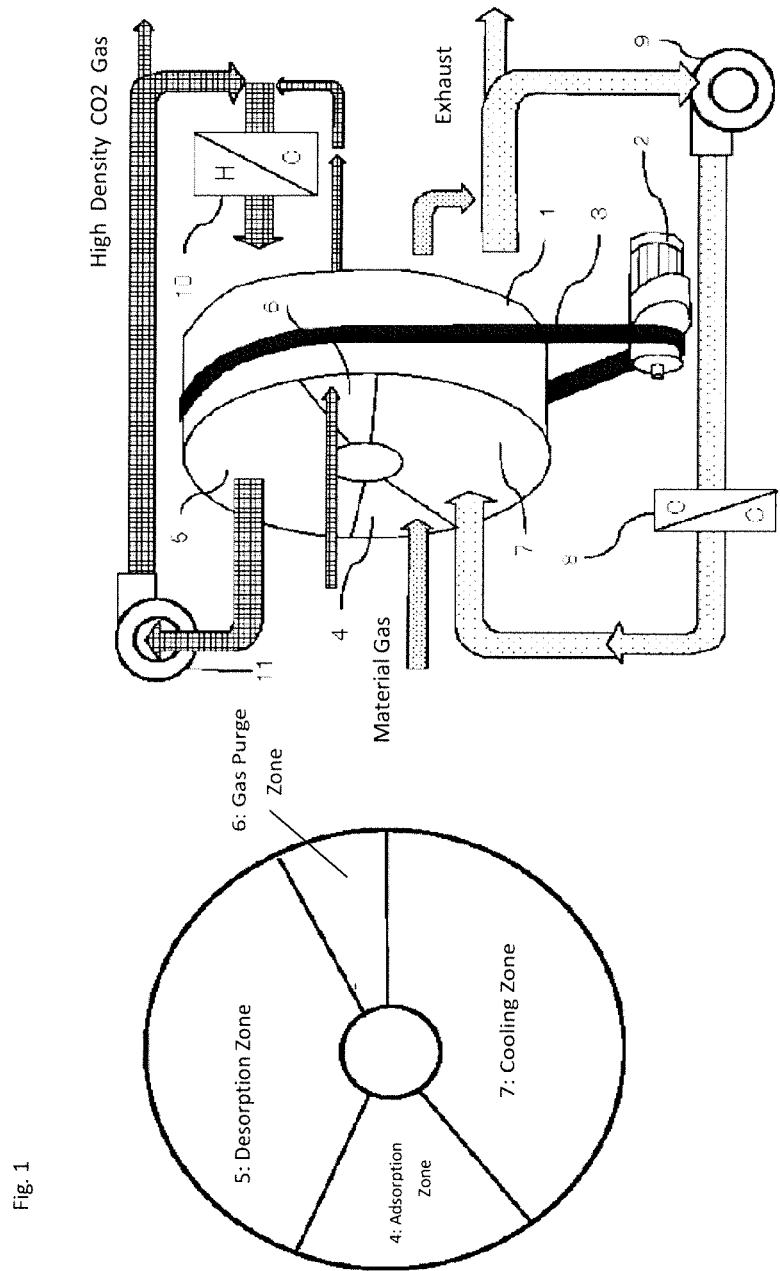
FIG. 1 shows a flow chart of the conventional example of the carbon dioxide recovery concentration apparatus shown in non-patent literature 1.

Reference will now be made in detail to the embodiments, examples of which are illustrated in the accompanying drawings, wherein like reference numerals refer to the like elements throughout. The embodiments are described below to explain the present invention by referring to the figures.

The proposed carbon dioxide recovery concentration apparatus is constituted so that it may return to an adsorption zone again through the adsorption zone, a preheating zone, a low concentration gas purge zone, a desorption zone by heating gas circulation, a high concentration gas purge zone, a pre-cooling zone, and the cooling zone by coolant gas circulation in turns along with a rotating direction of a rotor.

The first characteristic point of the proposal is that a preheating zone and a pre-cooling zone constitute a circulation circuit by a closed circuit and gas is made to circulate by the blower.

In a pre-cooling zone, the gas which pre-cools the honeycomb rises in heat by heat recollection. There is an advantage of preheating the honeycomb with the heat which carried out heat recollection before moving to a heating desorption zone by making a preheating zone carry out the circulation inflow of the gas. By pre-cooling thermal storage of a honeycomb in a pre-cooling zone, there is an advantage that the cooling load can be reduced in the next cooling zone.

In the amount of circulating gas of pre-cooling and a preheating zone, an optimal value exists, and the calorific capacity of the honeycomb which crosses a pre-cooling zone and a preheating zone to unit time and the calorific capacity of the gas to pass are necessary to set equally. There are few energy-saving effects as too little of the calorific capacity of the gas. On the other hand, if it becomes superfluous, the temperature of a honeycomb goes up too much in a pre-heating zone, desorption of carbon dioxide will start, a honeycomb is cooled in a pre-cooling zone and adsorption of carbon dioxide starts conversely. That is, carbon dioxide recovery efficiency will be reduced.

The optimal amount W of pre-cooling and preheating the circulating gas is calculable by formula-1.

$$W(kg/h)=\pi/4 \times (D2-d2) \times \zeta \times L \times N \times \gamma H \times CH/CG \quad \text{Formula-1}$$

Hereinafter,
D: effective outside diameter of rotor (m),
d: effective inside diameter of rotor (m),
$\zeta$: effective area rate of rotor end face,
L: width of rotor (m),
N: number of rotations of rotor (rph),
$\gamma H$: bulk specific gravity of honeycomb (Kg/m$^3$),
CG: specific heat of gas,
CH: specific heat of honeycomb material The optimal amount W of pre-cooling and preheating the circulating gas is proportional to rotor number of rotations N. Effective area rate of rotor $\zeta$ is a rate of area effective in ventilation excluding the area which is not ventilated such as spork of rotor.

The second characteristic point of the proposal is that, along with a rotating direction of rotor, a low concentration gas purge zone is provided before a heating desorption zone and a high concentration gas purge zone is provided after a heating desorption zone, and resolves the problem by the gas which is full of the clearance of the honeycomb by rotation of the rotor moving and flowing into the next zone. That is, in a low concentration gas purge zone, the problem of deterioration in a carbon dioxide recovery rate in a desorption zone is solved, and simultaneously, in a high concentration gas purge zone, the problem of the fall of the carbon dioxide levels is solved.

Even when the amount of purge gas is too little and even when it is superfluous, it serves as an opposite effect. If the amount of purge gas is too little, the purge effect is insufficient. On the other hand, if it is superfluous, the high concentration gas used for the purge in the low concentration gas purge zone flows out and, in a high concentration gas purge zone, the low concentration gas used for the purge flows into a high concentration desorption zone, thereby the meaning of a gas purge is lost. The purge effect calculates the amount QGP of optimal purge gas used as the maximum by formula-2.

$$QGP(m^3/h)=\pi/4 \times (D2-d2) \times \zeta \times L \times N \times \Psi \quad \text{Formula-2}$$

$\Psi$: honeycomb percentage of void.

Since calorific capacity is important for the optimal gas volume W in pre-cooling zone and a preheating zone in the formula-1, the unit is represented by kg/h. On the other hand, since capacity is important for the amount QGP of optimal purge gas, it is calculated by m$^2$/h. Since the capacity of gas changes at the temperature of gas, it is calculated with the mean temperature of an entrance and exit.

For example, in the case where D=4, d=0.6, $\zeta$=0.8, L=0.5, N=10 and $\Psi$=0.8, the amount of optimal purges is temporarily set to QGP=39.2 m$^3$/h. In the above conditions for the carbon dioxide concentration apparatus, if purge does not carry out, the low concentration gas of 39.2 m$^3$/h is mixed in the high concentration gas in a desorption zone, and recovery concentration reduces. Also, in a desorption zone, the high concentration carbon dioxide gas of 39.2 m$^3$/h reduces a recovery rate by carrying out a move outflow in the next zone of the desorption zone by rotation of a rotor. If the amount of carbon dioxide recoveries in the carbon dioxide recovery concentration apparatus of this class is guessed from a projection with 300-400 m$^3$/h, the capacity before and behind 10% of the high concentration gas in which the low concentration gas of the capacity around 10% mixed in the high concentration gas collected in the desorption zone, and the collected high concentration gas of the capacity around 10% is spilt out outside the desorption zone.

Since flue gas has a high temperature and a high humidity and is mixed with harmful gas such as NOx, SOx and particulates, it is necessary to provide a pretreatment system disclosed in the patent document 4 such as NOx removal equipment, wet-scrubber, a desulfurization facility and a bug filter, and removal of the flue gas and the particulates carries out. When using the honeycomb rotor which supported zeolite system adsorption material for carbon dioxide concentration, since zeolite adsorbs vapor preferentially rather than carbon dioxide and carbon dioxide adsorption capability declines, it is necessary to dehumidify and introduce into about dew point temperature minus 20° C. to minus 60° C. in the pretreatment by a honeycomb rotor dehumidifier as disclosed in the patent document 4.

In a case of the rotor which carries the carbon dioxide adsorption material impregnated by the amine system absorbent and the carbonate system absorbent to, for example, porous solid adsorption material which cannot be subject to the influence of vapor to adsorption of carbon dioxide, the pretreatment of dehumidification is unnecessary or becomes easy. In any preferred embodiments as below, the pretreatment system to be needed is not illustrated as a certain thing.

FIG. 1 is disclosed by the non-patent document 1. The carbon dioxide recovery concentration apparatus rotates carbon dioxide adsorption honeycomb rotor 1 by rotor drive motor 2 through a rotor drive belt (or chain) 3 at a velocity of a few rotations from a dozen rotation. It comprises a cycle which returns to adsorption zone 4 through adsorption zone 4, desorption zone 5, gas purge zone 6, and cooling zone 7 along with a rotating direction of a rotor 1 within one rotation of the rotor. The circulation circuit in a cooling zone 7, a gas cooling coil 8 and a coolant gas blower 9 is constituted. The circulation circuit in a desorption zone 5, a desorption gas heating coil 10 and a desorption gas circulation blower 11 is constituted.

Operation of the conventional example of the above composition is explained below.

The material gas in which flue gas is pretreated is introduced into the adsorption zone 4, and a honeycomb adsorbs carbon dioxide, concentration decreases and the material gas carries out merge with the exit air of cooling zone 7 to mix. The merged gas is cooled in coolant gas circulation blower 9, passes through the gas cooling coil 8, and is introduced into the cooling zone 7. After the gas moves to the cooling zone 7 through the desorption zone 5 and the purge zone 6, a honeycomb is cooled in cooling zone 7 in order to recover the adsorption capability of a honeycomb which has not recovered in carbon dioxide adsorption capability due to high temperature. Adsorption of carbon dioxide also advances in cooling zone 7. As to the gas which circulates through cooling zone 7, the material gas introduced from adsorption zone 4 for the capacity except the recovered carbon dioxide serves as a surplus, is discharged to an outside of a system and is exhausted to the atmosphere.

In a desorption gas circulation circuit, high concentration carbon dioxide gas is heated at 140-220° C. with desorption gas heating coil 10, is introduced into desorption zone 5 and makes the carbon dioxide which heats the honeycomb and is adsorbed to the honeycomb desorb. The gas which comes out of the desorption zone 5 returns to desorption gas heating coil 10 again to circulate in desorption gas circulation blower 11, the gas in a circulation circuit increases by the desorbed carbon dioxide gas, and parts for the capacity which increased are taken out and recovered outside a circulation circuit.

In a honeycomb rotor dehumidifier or a honeycomb rotor organic-solvent concentration apparatus, the heated air is introduced into the desorption zone, and it desorbs the vapor which is adsorbed to a honeycomb or VOC by air as carrier gas. However, if the carrier gas is used for the carbon dioxide concentration apparatus, recovery levels of carbon dioxide will be reduced. Therefore, high concentration carbon dioxide gas is used for desorption. A completely different view from a honeycomb rotor dehumidifier or a honeycomb rotor organic-solvent concentration apparatus is needed.

In the purge zone 6, the high concentration carbon dioxide gas included in the clearance of the honeycomb which has moved from the desorption zone 5 is purged and is made to return to desorption zone 5. Thus, the spill of the carbon dioxide recovered is prevented. Although a part of coolant gas is used as purge gas, it is also possible to use material gas. By this gas purge, there is an effect which improves a carbon dioxide recovery rate.

If the quantity of the amount of purge gas is further increased, desorption of 拔adsorbing material will be promoted in gas purge zone 6 by using preheating and also heat recollection in purge zone 6 will be carried out to reuse in desorption zone 5, there will be an energy saving effect. It will be used abundantly with a rotor type dehumidifier and a rotor type organic-solvent concentration apparatus. However, since gas with low carbon dioxide levels is introduced into a desorption circuit and reduces carbon dioxide recovery concentration in a case of is the target carbon dioxide concentration apparatus as a target of the proposal, it will be not realized to increasing the quantity of the amount of purge gas in order to achieve the energy-saving effect.

In the purge of this conventional embodiment, the low concentration carbon dioxide gas included by the honeycomb immediately after rotating in desorption zone 5 from adsorption zone 4 flows into desorption zone 5 and reduces recovery concentration. However, it cannot be prevented. Also, it is not possible to reuse of thermal storage of the honeycomb after passing through the desorption zone 5, and many cooling energies is needed in the cooling zone 7. Thus, the purge of this conventional embodiment has such faults.

A person who has the ordinarily engineering knowledge may think of saving the energy by carrying out heat recollection by heat exchange with the outlet gas of cooling zone 7 and the outlet gas of desorption zone 5. However, since there is little difference of the mean temperature of the exit air of cooling zone 7 and the mean temperature of the exit air of desorption zone 5 in this carbon dioxide concentration system and the practical use efficiency of a standstill type sensible heat exchanger is 50 to 60%, if it takes into consideration, there will be few energy-saving effects and only initial costs will increase.

[Preferred Embodiment 1]

Figure 2:
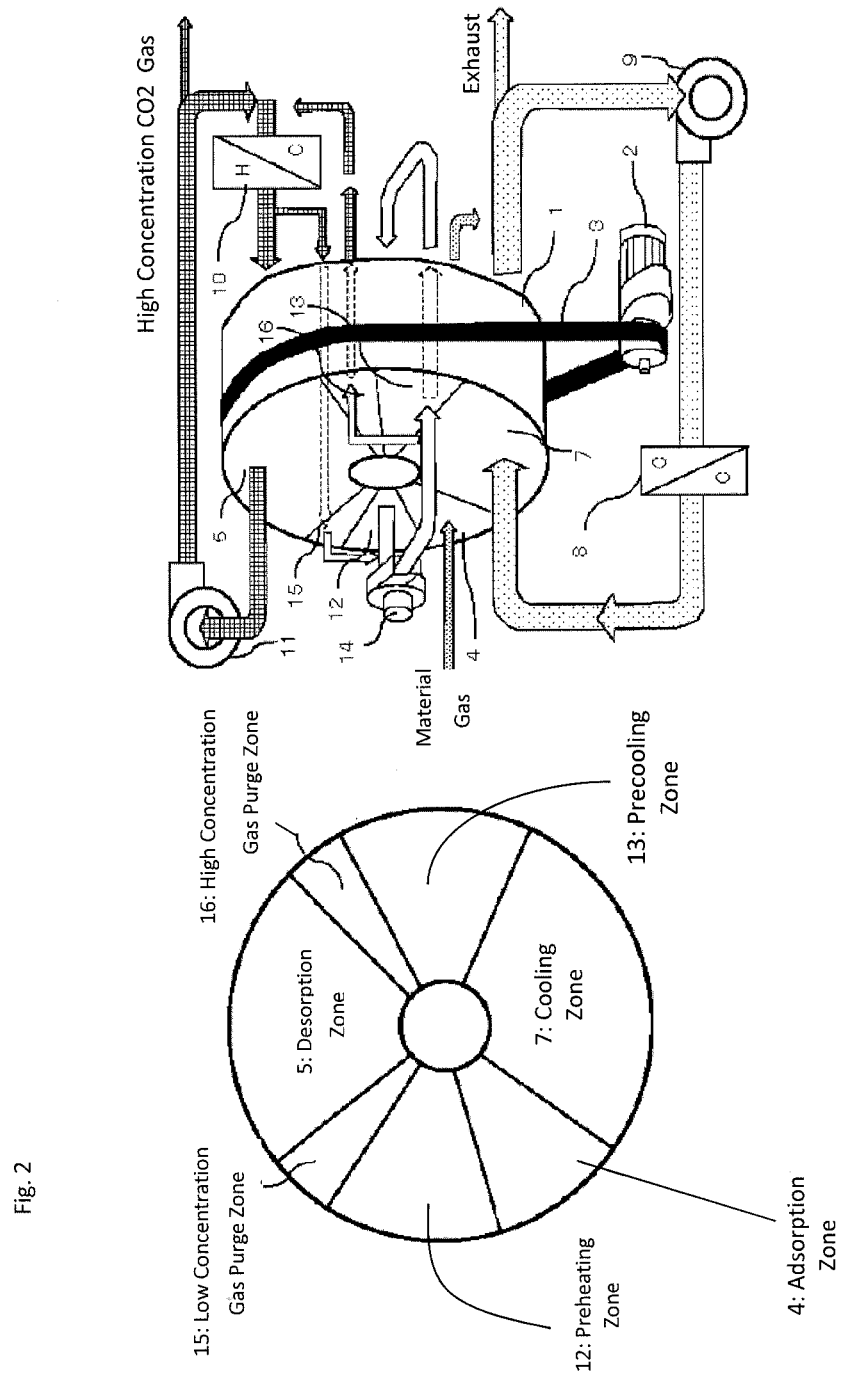
FIG. 2 shows a flow chart of the preferred embodiment 1 of the proposed carbon dioxide recovery concentration apparatus.

The preferred embodiment 1 is shown in FIG. 2. The same number is attached to the same structure as the construct of the conventional embodiment in FIG. 1.

The embodiment 1 is constituted so that a carbon dioxide recovery concentration apparatus returns to the adsorption zone 4 through the adsorption zone 4, a preheating zone 12, a low concentration gas purge zone 15, a heating desorption zone 5, a high concentration gas purge zone 16, a pre-cooling zone 13, a cooling zone 7 in turn along with a rotating direction of the carbon dioxide recovery concentration rotor.

It is the same as a conventional embodiment that material gas is merged and mixed in a coolant gas circulation circuit after passing through the adsorption zone 4, the gas is cooled by the gas cooling coil 8, circulates in the circuit to cool the honeycomb of cooling zone 7, and a part of the gas is exhausted.

The desorption gas constitutes the circulation circuit by a desorption gas circulation blower 11 between a desorption gas heating coil 10 and a desorption zone 5, and desorption gas desorbs the carbon dioxide adsorbed while the desorption gas is heated and circulated. It is the same as a conventional embodiment that the amount of capacity of the carbon dioxide desorbed in the desorption zone 5 becomes superfluous and it is taken out and is collected outside the circulation circuit.

As the first different point from a conventional embodiment, a preheating zone 12 and a pre-cooling zone 13 are provided at the front of cooling zone 7 and at the back of an adsorption zone 4 along with a rotating direction of a rotor, and each zone constitutes a circulation circuit, and it is constituted so that gas may circulate in pre-cooling/preheating gas circulation blower 14.

As the second point, a low concentration gas purge zone 15 is provided between a preheating zone 12 and a desorption zone 5, and purge substitution carries out by using the high concentration gas of the desorption zone so that the low concentration gas included in the clearance of the honeycomb may not be carried into the desorption zone by the rotational transfer of a rotor.

Also, a high concentration gas purge zone 16 is provided between a desorption zone 5 and a pre-cooling zone 13, and the high concentration carbon dioxide gas included by the clearance of the honeycomb returns to a desorption circuit by purging by using the gas of pre-cooling zone 13 so that the high concentration carbon dioxide gas may not be carried away outside a desorption zone by the rotation of a rotor.

Operation of embodiment 1 of the proposed apparatus is explained as below. The material gas in which flue gas is pretreated is introduced into adsorption zone 4, a honeycomb adsorbs carbon dioxide, its concentration falls, and the material gas is merged to the outlet of gas cooling zone 7. The merged gas passes through gas cooling coil 8 to be cooled by a coolant gas circulation blower 9 and is introduced into the gas cooling zone 7 to be circulated. In cooling zone 7, the introduced gas cools the honey comb which has moved through high concentration gas purge zone 16 from desorption zone 5 and which has not yet recovered carbon dioxide adsorption capability at high temperature, and makes adsorption capability recovered. In the circulating gas of cooling zone 7, it is the same as that of a conventional embodiment that the amount of the capacity of the material gas introduced into the adsorption zone 4 except the amount of a part of the recovered carbon dioxide becomes a surplus. It is exhausted out of the system and is discharged to the atmosphere.

In the desorption circuit, high concentration carbon dioxide gas is heated at 140-220° C. by desorption gas heating coil 10, and is introduced into desorption zone 5. The introduced gas heats the honey comb to desorb the carbon dioxide which has been adsorbed to the honeycomb. The gas which came out of the desorption zone 5 returns to the desorption gas heating coil 10 again by desorption gas circulation blower 11, and circulates. It is the same as that of a conventional embodiment that the amount of the desorbed carbon dioxide increases the quantity of the gas in a circuit by capacity, and the increased parts are taken out and collected out of a circulating route.

As the first different point from a conventional embodiment, in the pre-cooling zone 13, a honeycomb is pre-cooled by the gas which passes the zone, the gas absorbs heat, its temperature rises and the heated gas circulates to the preheating zone 12. The pre-cooled honey comb moves to the cooling zoon 7 in order to recover adsorption capability and is further cooled. Thus, the pre-cooled honeycomb has the effect that the cooling energies in cooling zone 7 are reducible.

In the preheating zone 12, the gas which has passed through the pre-cooling zone 13 and has risen in heat is introduced, a honeycomb is preheated. The pre-heated gas is cooled and circulates to pre-cooling zone 13.

The preheated honeycomb passes through low concentration gas purge zone 15, and moves to a desorption zone 5. In the desorption zone 5, a honeycomb is heated by hot high concentration carbon dioxide gas to desorb carbon dioxide gas. The amount of thermal energies supplied to desorption zone 5 is reducible by the preheating effect.

As stated above, the embodiment has the effect that the pre-cooling zone 13 and the preheating zone 12 are provided, the circuits which circulate through each is constituted, and the amount of cooling energies and the amount of heating energy for desorption are simultaneously reducible by circulating the gas.

The second point is two gas purge zones. In high concentration gas purge zone 16, the high-concentration carbon dioxide gas included by the honeycomb clearance immediately after a rotor rotates from desorption zone 5 to high concentration gas purge zone 16 is introduced by a part of gas of pre-cooling zone 13, is purged and is returned to a desorption circuit.

In a low concentration gas purge zone, the low concentration carbon dioxide gas included in the honeycomb clearance immediately after carrying out rotational transfer from the preheating zone 12 to the low concentration gas purge zone 15 is purged by the high concentration carbon dioxide gas in a desorption zone to be exchanged, and the low concentration gas prevents from being carried into desorption zone 5.

In the above operation, the low concentration gas is prevented from being carried into a desorption zone, high concentration gas is prevented from being simultaneously carried away outside a desorption zone. Therefore, the object of improvement in recovery concentration and improvement in a recovery rate is achieved simultaneously.

[Preferred Embodiment 2]

Figure 3:
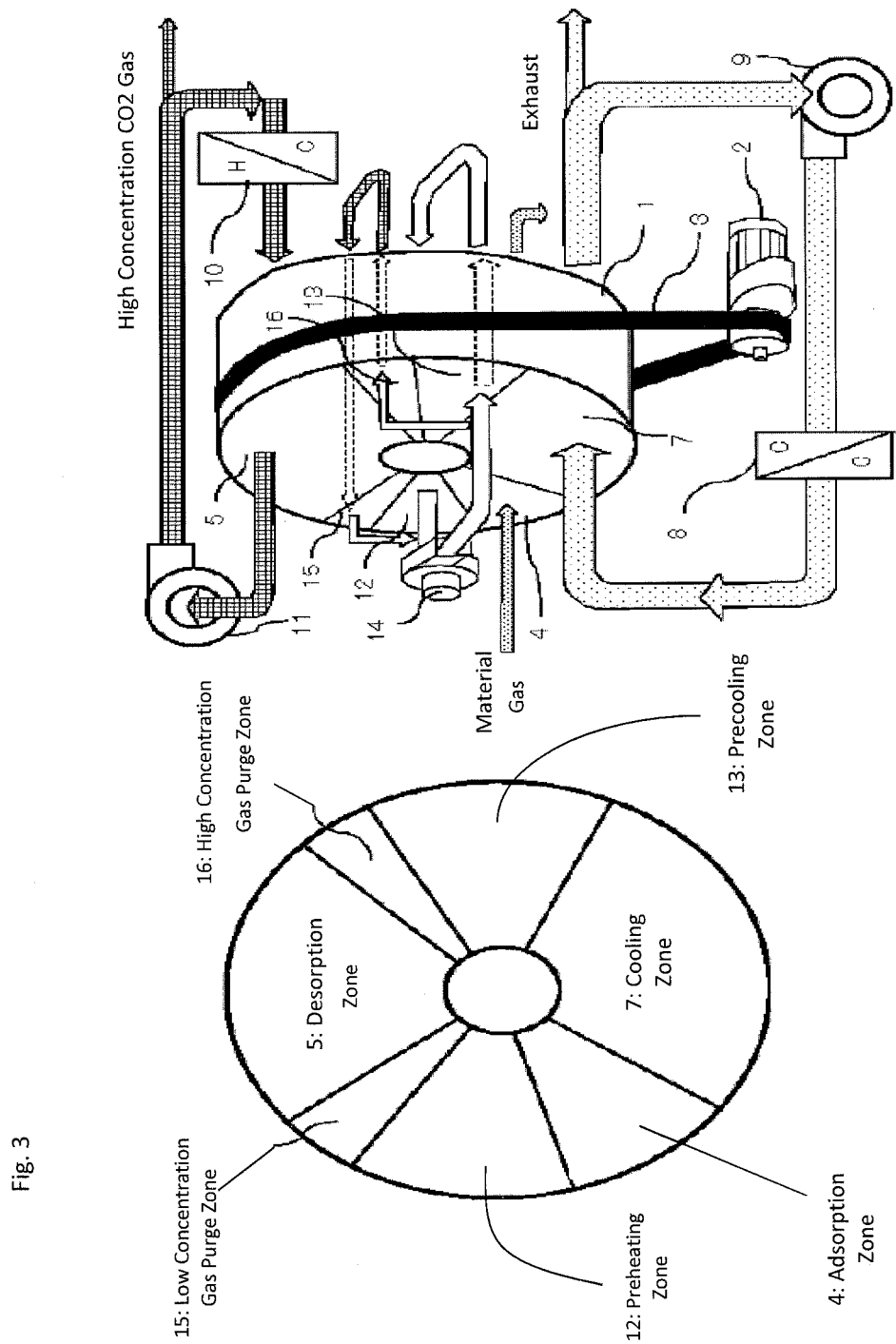
FIG. 3 shows a flow chart of the preferred embodiment 2 of the proposed carbon dioxide recovery concentration apparatus.

The preferred embodiment 2 is shown in FIG. 3. In the embodiment 1, the high concentration gas in the desorption circuit introduced into the low concentration gas purge zone 15, and the gas purged in the high concentration gas purge zone 16 is returned to the desorption circuit. However, the preferred embodiment 2 has a flow which does not relate to the desorption circuit. The high concentration gas purge zones 16 is purged by using a part of gas of pre-cooling zone 13, the recovered high concentration gas is introduced into low concentration gas purge zone 15, and the purged gas is made to return to an exit of the pre-cooling zone 12. Although the effect of a gas purge is the same, it is not subject to the influence of desorption circuit pressure.

[Preferred Embodiment 3]

Figure 4:
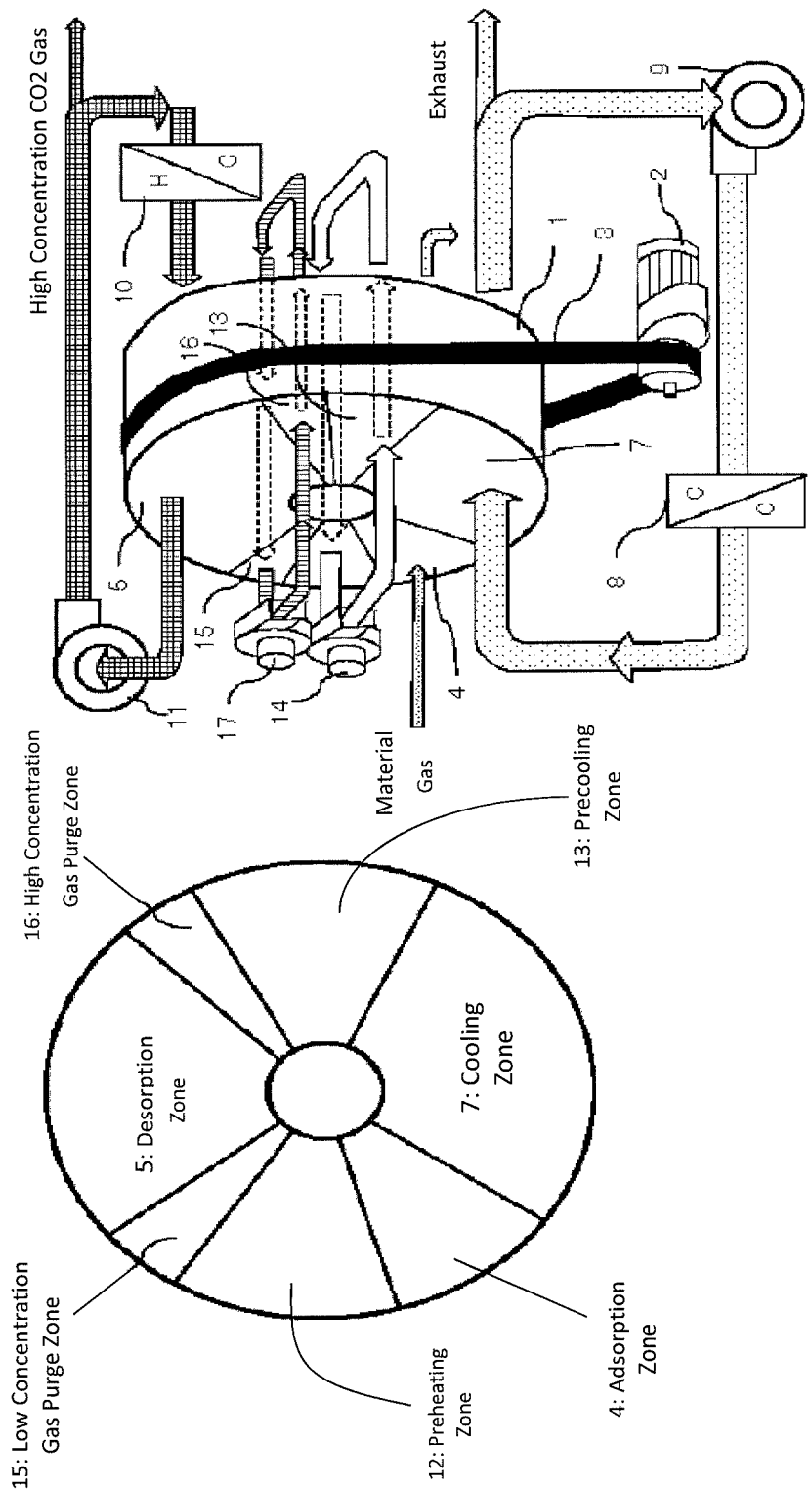
FIG. 4 shows a flow chart of the preferred embodiment 3 of the proposed carbon dioxide recovery concentration device.
Figure 5:
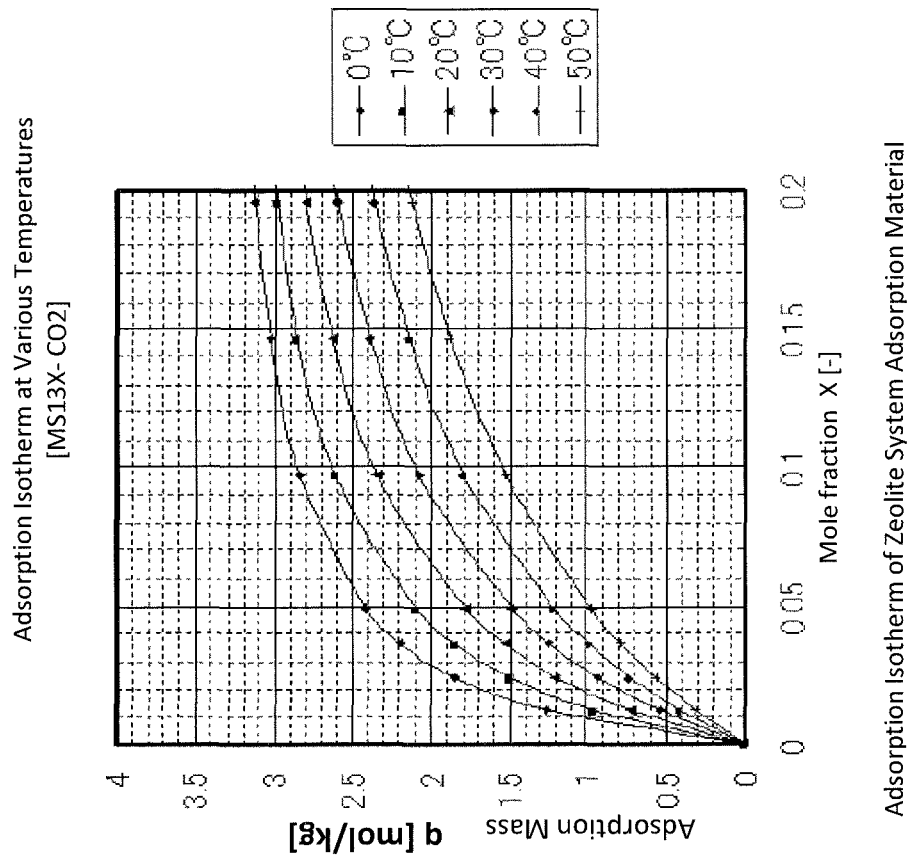
FIG. 5 shows the carbon dioxide adsorption isotherm of zeolite system adsorption material.
Figure 6:
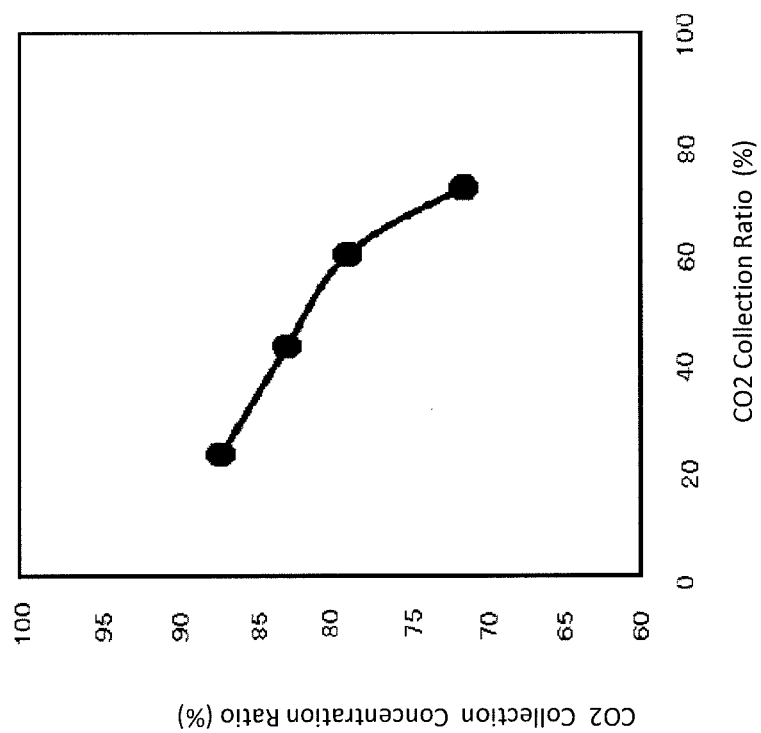
FIG. 6 shows a graph of the example of survey of a carbon dioxide recovery rate and recovery concentration.

The preferred embodiment 3 is shown in FIG. 4. As the difference from the embodiments 1 and 2, the embodiment 3 constitutes the closed circulation circuit by the low concentration gas purge zone 15 and the high concentration gas purge zone 16, and the gas is made to circulate in purge gas circulation blower 17. Since the low concentration gas purge zone 15 and the high concentration gas purge zone 16 constitute a circulation route, both of them are not subject to the influence of the pressure of other zones.

In the above embodiments 1-3, the embodiments are explained by using the carbon dioxide gas which is acidic gas. However, the proposal is not limited to the carbon dioxide gas, and is applicable to other acidic gases, alkaline gas, etc. by changing suitably adsorbent such as zeolite supported on an adsorption honeycomb rotor, activated carbon, silica gel, meso-porous silica, alumina, ion-exchange resin, argillite, and an inorganic compound.

The proposed carbon dioxide recovery concentration apparatus can improve simultaneously recovery concentration and recovery rate, and can be applied to a case of carrying out concentration removal of the carbon dioxide from exhaust gas such as power plant since the carbon dioxide can be effectively condensed with little consumption energy, Although a few embodiments have been shown and described, it would be appreciated by those skilled in the art that changes may be made in these embodiments without departing from the principles and spirit of the invention, the scope of which is defined in the claims and their equivalents.

What is claimed is:

1. A gas recovery concentration apparatus comprising:
    a rotor having an adsorption zone, a pre-heating zone, a low concentration gas purge zone, a desorption zone, a high concentration gas purge zone, a pre-cooling zone and a cooling zone provided in turn along a rotating direction of the rotor, the rotor having an adsorption capability for acidic gas, said rotor moving from a present zone to a next zone in turn by rotating said rotor, the rotor having a gas circulating between said pre-heating zone and said pre-cooling zone;
    a condenser which cools gas for said cooling zone, with gas being circulated between said cooling zone and said condenser;
    a heater which heats gas to be sent to said desorption zone, with circulating gas being circulated between said desorption zone and said heater and a part of the circulating gas flowing to said low concentration gas purge zone;
    a first gas circulating route provided between said pre-heating zone and said pre-cooling zone, the gas which has passed said low concentration gas purge zone flowing to said first gas circulating route, a portion of the gas which flows in said first gas circulating route flowing to said high concentration gas purge zone; and
    a second gas circulating route provided between said desorption zone and said heater, the gas which flows out from said high concentration gas purge zone flowing to said second gas circulating route, and a portion of the gas which flows in said second gas circulating route flowing out of said rotor as high concentration carbon dioxide.

2. A gas recovery concentration apparatus according to claim 1, wherein
    an equivalent amount of purge gas to opening capacity of a honeycomb which passes through a zone per unit time is sent to said low concentration gas purge zone and said high concentration gas purge zone.

3. A gas recovery concentration apparatus according to claim 1 wherein
a gas having the same calorific capacity as a honeycomb which passes through said pre-cooling and said pre-heating zone per unit time is sent to said pre-cooling and said pre-heating zone.

4. A gas recovery concentration apparatus according to claim 1, wherein
said pre-heating zone and said pre-cooling zone constitutes a circulation circuit, and said pre-heating and said pre-cooling gas is circulated.

5. A gas recovery concentration apparatus comprising:
a rotor having an adsorption zone, a pre-heating zone, a low concentration gas purge zone, a desorption zone, a high concentration gas purge zone, a pre-cooling zone and a cooling zone provided in turn along a rotating direction of the rotor, the rotor having an adsorption capability for acidic gas, said rotor moving from a present zone to a next zone in turn by rotating said rotor, the rotor having a gas circulating between said pre-heating zone and said pre-cooling zone;
a condenser which cools gas for said cooling zone, with gas being circulated between said cooling zone and said condenser;
a heater which heats gas to be sent to said desorption zone, with circulating gas being circulated between said desorption zone and said heater;
a part of the gas which has passed through said pre-heating zone flowing to said high concentration purge zone, the gas which has passed through said high concentration purge zone to mix with the gas which has passed through said pre-heating zone; and
a circulating zone between said desorption zone and said heater, a part of the gas which flows in said circulating zone flowing out of said rotor as high concentration carbon dioxide.

6. A gas recovery concentration apparatus according to claim 5, wherein
an equivalent amount of purge gas to opening capacity of a honeycomb which passes through a zone per unit time is sent to said low concentration gas purge zone and said high concentration gas purge zone.

7. A gas recovery concentration apparatus according to claim 5, wherein
a gas having the same calorific capacity as a honeycomb which passes through said pre-cooling and said pre-heating zone per unit time is sent to said pre-cooling and said pre-heating zone.

8. A gas recovery concentration apparatus according to claim 5, wherein
said pre-heating zone and said pre-cooling zone constitutes a circulation circuit, and said pre-heating and said pre-cooling gas is circulated.

9. A gas recovery concentration apparatus comprising:
a rotor having an adsorption zone, a pre-heating zone, a low concentration gas purge zone, a desorption zone, a high concentration gas purge zone, a pre-cooling zone and a cooling zone provided in turn along a rotating direction of the rotor, the rotor having an adsorption capability for acidic gas, said rotor moving from a present zone to a next zone in turn by rotating said rotor, the rotor having a gas circulating between said pre-heating zone and said the pre-cooling zone; the rotor having gas flowing between said high concentration gas purge zone and said low concentration gas purge zone,
a condenser which cools gas for said cooling zone, with gas being circulated between said cooling zone and said condenser; and
a heater which heats gas to be sent to said desorption zone, with circulating gas being circulated between said desorption zone and said heater; and
a portion of the gas which circulates gas between the desorption zone and the heater flowing out of said rotor as high concentration carbon dioxide.

10. A gas recovery concentration apparatus according to claim 9, wherein
an equivalent amount of purge gas to opening capacity of a honeycomb which passes through a zone per unit time is sent to said low concentration gas purge zone and said high concentration gas purge zone.

11. A gas recovery concentration apparatus according to claim 9, wherein
a gas having the same calorific capacity as a honeycomb which passes through said pre-cooling and said pre-heating zone per unit time is sent to said pre-cooling and said pre-heating zone.

12. A gas recovery concentration apparatus according to claim 9, wherein
said pre-heating zone and said pre-cooling zone constitutes a circulation circuit, and said pre-heating and said pre-cooling gas is circulated.

* * * * *